US006188981B1

(12) United States Patent
Benyassine et al.

(10) Patent No.: US 6,188,981 B1
(45) Date of Patent: Feb. 13, 2001

(54) METHOD AND APPARATUS FOR DETECTING VOICE ACTIVITY IN A SPEECH SIGNAL

(75) Inventors: Adil Benyassine; Eyal Shlomot, both of Irvine, CA (US)

(73) Assignee: Conexant Systems, Inc., Newport Beach, CA (US)

( * ) Notice: Under 35 U.S.C. 154(b), the term of this patent shall be extended for 0 days.

(21) Appl. No.: 09/156,416

(22) Filed: Sep. 18, 1998

(51) Int. Cl.[7] .......... G10L 15/00; G10L 11/02; G10L 11/04; G10L 21/00

(52) U.S. Cl. .......... 704/233; 704/231; 704/207

(58) Field of Search .......... 704/233, 219, 704/246, 214, 240, 243, 231, 207; 709/247

(56) References Cited

U.S. PATENT DOCUMENTS

| | | | | |
|---|---|---|---|---|
| 5,664,055 | * | 9/1997 | Kroon | 704/233 |
| 5,732,389 | * | 3/1998 | Kroon et al. | 704/223 |
| 5,737,716 | * | 4/1998 | Bergstrom et al. | 704/208 |
| 5,774,849 | | 6/1998 | Benyassine . | |

FOREIGN PATENT DOCUMENTS

| | | | |
|---|---|---|---|
| 0 785 541 A2 | * | 1/1997 | (DE) . |
| 0 785 419 A2 | * | 7/1997 | (DE) . |
| 0 784 311 A1 | | 7/1997 | (EP) . |

OTHER PUBLICATIONS

A. Benyassine, E. Sholomot, S. Huan–Yu & E. Yuen, "A Robust Low Complexity Voice Activity Detection Algorithm for Speech Communication Systems", IEEE Workshop on Speech Coding for Telecommunications Proceedings, Sep. 10, 1997.*

L. Siegel & A. Bessey, "Voiced/Unvoiced/Mixed Excitation Classification of Speech," IEEE Transactions on Acoustics, Speech and Signal Processing, Jun. 1982.*

Y. Ephraim, "On minimum mean–square error speech enhancement", International Conference on Acoustics, Speech and Signal Processing, IEEE, Apr. 1991.*

Y. Ephraim, R.M. Gray, "A unified approach for encoding clean and noisy sources by means of waveform and autoregressive model vector quantization," Transactions on Information Theory, IEEE, Jul. 1998.*

Discrete–Time Processing of Speech Signals, by John R. Deller, Jr., et al, pp. 327–329 (1987).

* cited by examiner

*Primary Examiner*—Tālivaldis I. Šmits
*Assistant Examiner*—Daniel A. Nolan

(57) ABSTRACT

A method and apparatus for generating frame voicing decisions for an incoming speech signal having periods of active voice and non-active voice for a speech encoder in a speech communications system. A predetermined set of parameters is extracted from the incoming speech signal, including a pitch gain and a pitch lag. A frame voicing decision is made for each frame of the incoming speech signal according to values calculated from the extracted parameters. The predetermined set of parameters further includes a frame full band energy, and a set of spectral parameters called Line Spectral Frequencies (LSF).

13 Claims, 4 Drawing Sheets

METHOD AND APPARATUS FOR DETECTING VOICE ACTIVITY IN A SPEECH SIGNAL

BACKGROUND OF THE INVENTION

1. Field of the Invention

The present invention relates generally to the field of speech coding in communication systems, and more particularly to detecting voice activity in a communications system.

2. Description of Related Art

Modern communication systems rely heavily on digital speech processing in general, and digital speech compression in particular, in order to provide efficient systems. Examples of such communication systems are digital telephony trunks, voice mail, voice annotation, answering machines, digital voice over data links, etc.

A speech communication system is typically comprised of an encoder, a communication channel and a decoder. At one end of a communications link, the speech encoder converts a speech signal which has been digitized into a bit-stream. The bit-stream is transmitted over the communication channel (which can be a storage medium), and is converted again into a digitized speech signal by the decoder at the other end of the communications link.

The ratio between the number of bits needed for the representation of the digitized speech signal and the number of bits in the bit-stream is the compression ratio. A compression ratio of 12 to 16 is presently achievable, while still maintaining a high quality reconstructed speech signal.

A significant portion of normal speech is comprised of silence, up to an average of 60% during a two-way conversation. During silence, the speech input device, such as a microphone, picks up the environment or background noise. The noise level and characteristics can vary considerably, from a quiet room to a noisy street or a fast moving car. However, most of the noise sources carry less information than the speech signal and hence a higher compression ratio is achievable during the silence periods. In the following description, speech will be denoted as "active-voice" and silence or background noise will be denoted as "non-active-voice".

The above discussion leads to the concept of dual-mode speech coding schemes, which are usually also variable-rate coding schemes. The active-voice and the non-active voice signals are coded differently in order to improve the system efficiency, thus providing two different modes of speech coding. The different modes of the input signal (active-voice or non-active-voice) are determined by a signal classifier, which can operate external to, or within, the speech encoder. The coding scheme employed for the non-active-voice signal uses less bits and results in an overall higher average compression ratio than the coding scheme employed for the active-voice signal. The classifier output is binary, and is commonly called a "voicing decision." The classifier is also commonly referred to as a Voice Activity Detector ("VAD").

A schematic representation of a speech communication system which employs a VAD for a higher compression rate is depicted in FIG. 1. The input to the speech encoder 110 is the digitized incoming speech signal 105. For each frame of a digitized incoming speech signal the VAD 125 provides the voicing decision 140, which is used as a switch 145 between the active-voice encoder 120 and the non-active-voice encoder 115. Either the active-voice bit-stream 135 or the non-active-voice bit-stream 130, together with the voicing decision 140 are transmitted through the communication channel 150. At the speech decoder 155 the voicing decision is used in the switch 160 to select the non-active-voice decoder 165 or the active-voice decoder 170. For each frame, the output of either decoders is used as the reconstructed speech 175.

An example of a method and apparatus which employs such a dual-mode system is disclosed in U.S. Pat. No. 5,774,849, commonly assigned to the present assignee and herein incorporated by reference. According to U.S. Pat. No. 5,774,849, four parameters are disclosed which may be used to make the voicing decision. Specifically, the full band energy, the frame low-band energy, a set of parameters called Line Spectral Frequencies ("LSF") and the frame zero crossing rate are compared to a long-term average of the noise signal. While this algorithm provides satisfactory results for many applications, the present inventors have determined that a modified decision algorithm can provide improved performance over the prior art voicing decision algorithms.

SUMMARY OF THE INVENTION

A method and apparatus for generating frame voicing decisions for an incoming speech signal having periods of active voice and non-active voice for a speech encoder in a speech communications system. A predetermined set of parameters is extracted from the incoming speech signal, including a pitch gain and a pitch lag. A frame voicing decision is made for each frame of the incoming speech signal according to values calculated from the extracted parameters. The predetermined set of parameters further includes a frame full band energy, and a set of spectral parameters called Line Spectral Frequencies (LSF).

BRIEF DESCRIPTION OF THE DRAWINGS

The exact nature of this invention, as well as its objects and advantages, will become readily apparent from consideration of the following specification as illustrated in the accompanying drawings, in which like reference numerals designate like parts throughout the figures thereof, and wherein.

DETAILED DESCRIPTION OF THE PREFERRED EMBODIMENTS

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a voice activity detection method and apparatus.

In the following description, the present invention is described in terms of functional block diagrams and process flow charts, which are the ordinary means for those skilled in the art of speech coding for describing the operation of a VAD. The present invention is not limited to any specific programming languages, or any specific hardware or software implementation, since those skilled in the art can readily determine the most suitable way of implementing the teachings of the present invention.

In the preferred embodiment, a Voice Activity Detection (VAD) module is used to generate a voicing decision which switches between an active-voice encoder/decoder and a non-active-voice encoder/decoder. The binary voicing decision is either 1 (TRUE) for the active-voice or 0 (FALSE) for the non-active-voice.

Figure 2A:
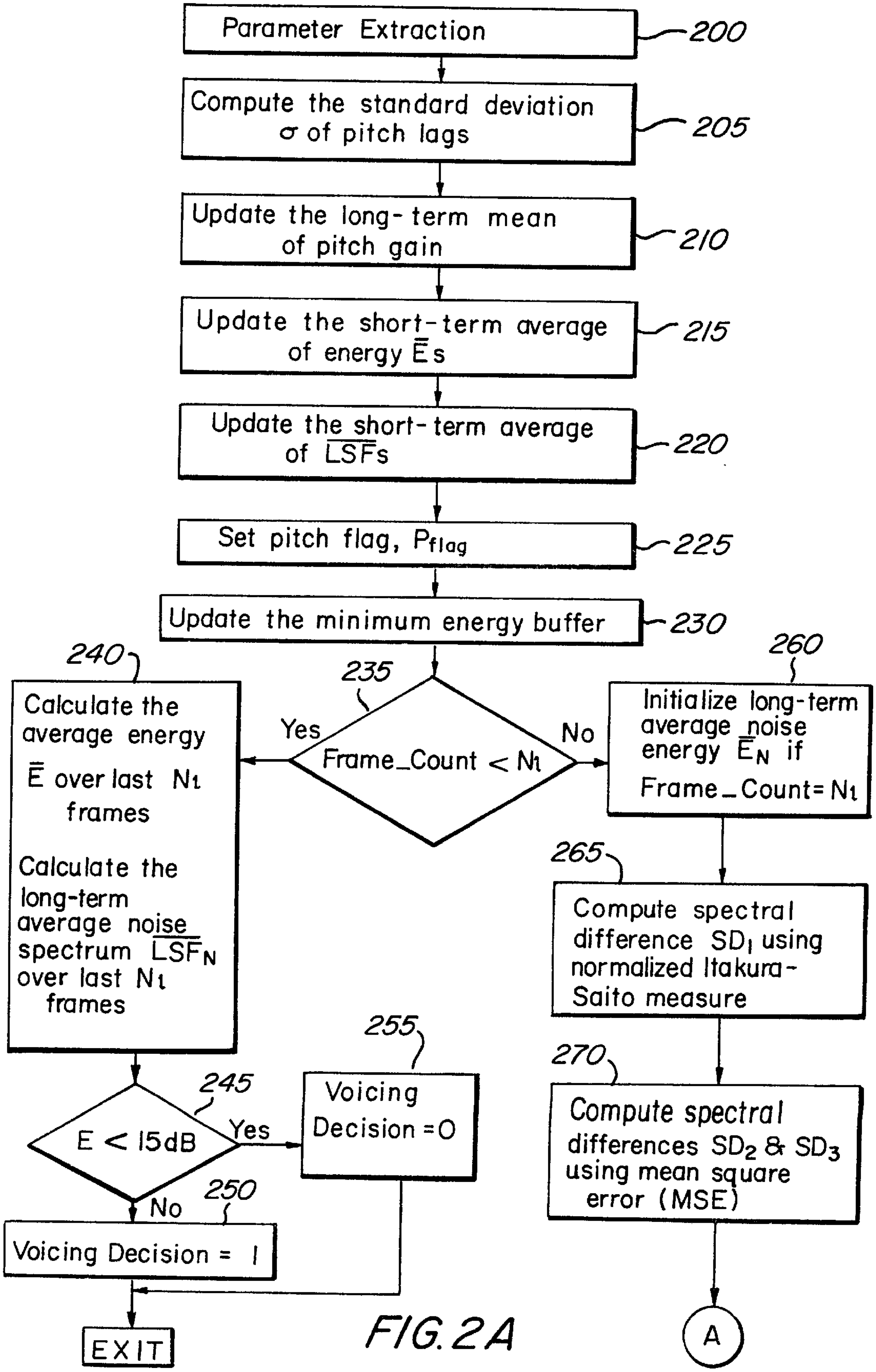
FIGS. 2(A) and 2(B) are process flowcharts illustrating the operation of the VAD in accordance with the present invention.
Figure 2B:
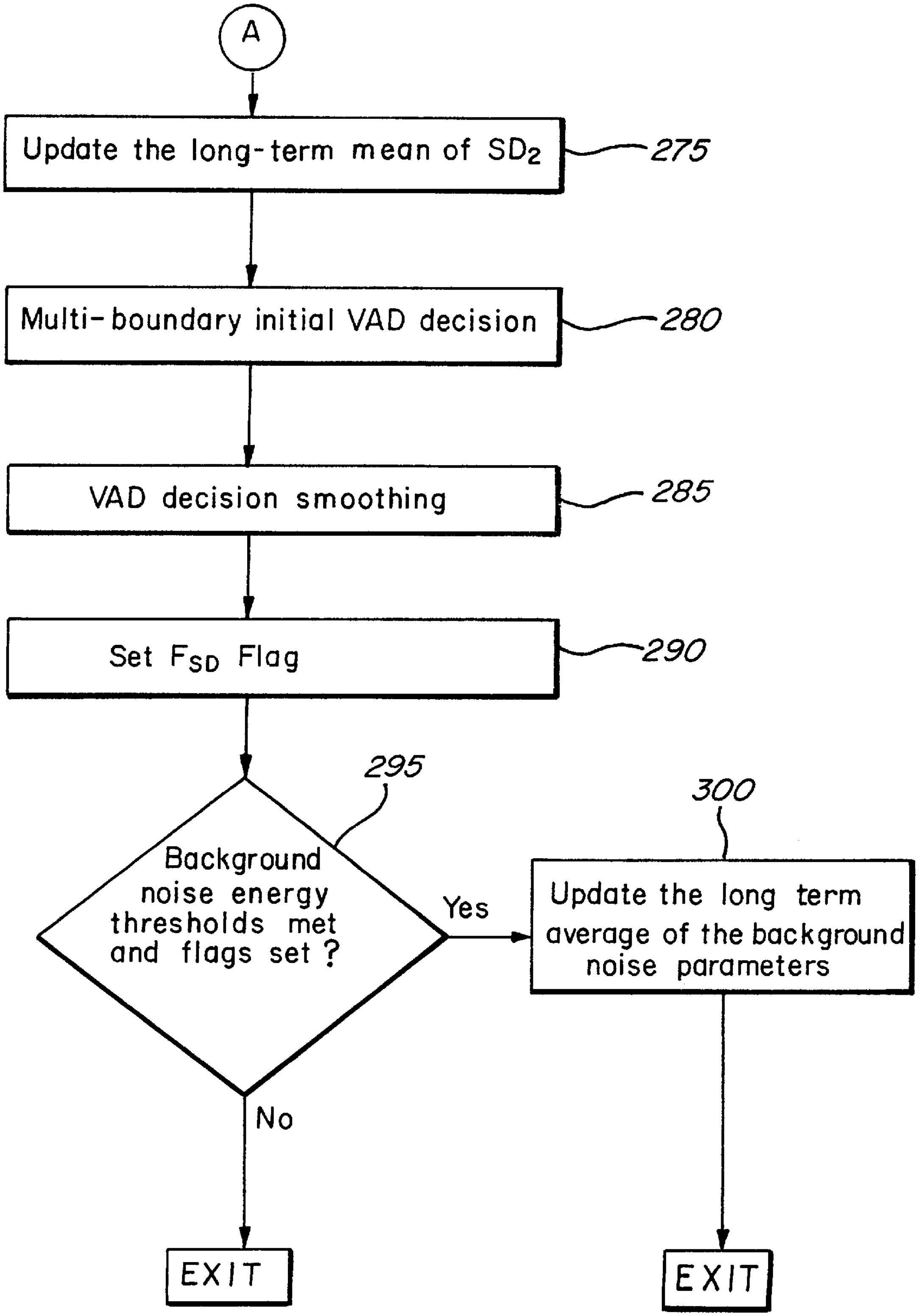

The VAD process flowchart is illustrated in FIGS. 2(A) and 2(B). The VAD operates on frames of digitized speech. The frames are processed in time order and are consecutively numbered from the beginning of each conversation/recording, The illustrated process is performed once per frame.

At the first block 200, four parametric features are extracted from the input signal. Extraction of the parameters can be shared with the active-voice encoder module 120 and the non-active-voice encoder module 115 for computational efficiency. The parameters are the frame full band energy, a set of spectral parameters called Line Spectral Frequencies ("LSF"), the pitch gain and the pitch lag. A set of linear prediction coefficients is derived from the auto correlation and a set of $\{\overline{LSF}_i\}_{i=1}^{P}$ is derived from the set of linear prediction coefficients, as described in ITU-T, Study Group 15 Contribution –Q. 12/15, Draft Recommendation G.729, Jun. 8, 1995, Version 5.0, or DIGITAL SPEECH—Coding for Low Bit Rate Communication Systems by A. M. Kondoz, John Wiley & Son, 1994, England. The full band energy E is the logarithm of the normalized first auto correlation coefficient R(0):

$$E = 10 \cdot \log_{10}\left[\frac{1}{N}R(0)\right],$$

where N is a predetermined normalization factor. The pitch gain is a measure of the periodicity of the input signal. The higher the pitch gain, the more periodic the signal, and therefore the greater the likelihood that the signal is a speech signal. The pitch lag is the fundamental frequency of the speech (active-voice) signal.

After the parameters are extracted, the standard deviation σ of the pitch lags of the last four previous frames are computed at block 205. The long-term mean of the pitch gain is updated with the average of the pitch gain from the last four frames at block 210. In the preferred embodiment, the long-term mean of the pitch gain is calculated according to the following formula:

$$\overline{Pgain} = 0.8 * \overline{Pgain} + 0.2 * [\text{average of last four frames}]$$

The short-term average of energy, $\overline{Es}$, is updated at block 215 by averaging the last three frames with the current frame energy. Similarly, the short-term average of LSF vectors, $\overline{LSFs}$, is updated at block 220 by averaging the last three LSF frame vectors with the current LSF frame vector extracted by the parameter extractor at block 200. If the standard deviation σ is less than $T_1$ or the long-term mean of the pitch gain is greater than $T_2$, then a flag $P_{flag}$ is set to one, otherwise $P_{flag}$ equals zero at block 225.

$$\text{If } \sigma < T_1 \text{ OR } P_{gain} > T_2, \text{ then } P_{flag}=1, \text{ else } P_{flag}=0.$$

In the preferred embodiment, $T_1=1.2$ and $T_2=0.7$. At block 230, a minimum energy buffer is updated with the minimum energy value over the last 128 frames. In other words, if the present energy level is less than the minimum energy level determined over the last 128 frames, then the value of the buffer is updated, otherwise the buffer value is unchanged.

If the frame count (i.e. current frame number) is less than a predetermined frame count Ni at block 235, where $N_l$ is 32 in the preferred embodiment, an initialization routine is performed by blocks 240–255. At block 240 the average energy $\overline{E}$, and the long-term average noise spectrum $\overline{LSFN}$ are calculated over the last $N_l$ frames. The average energy $\overline{E}$ is the average of the energy of the last $N_l$ frames. The initial value for $\overline{E}$, calculated at block 240, is:

$$\overline{E} = \frac{1}{N_l}\sum_{n=1}^{N_l} E$$

The long-term average noise spectrum $\overline{LSFN}$ is the average of the LSF vectors of the last $N_l$ frames. At block 245, if the instantaneous energy E extracted at block 200 is less than 15 dB, then the voicing decision is set to zero (block 255), otherwise the voicing decision is set one (block 250). The processing for the frame is then completed and the next frame is processed, beginning with block 200.

The initialization processing of blocks 240–255 initializes the processing over the last few frames. It is not critical to the operation of the present invention and may be skipped. The calculations of block 240 are required, however, for the proper operation of the invention and should be performed, even if the voicing decisions of blocks 245–255 are skipped. Also, during initialization, the voicing decision could always be set to "1" without significantly impacting the performance of the present invention.

If the frame count is not less than $N_l$ at block 235, then the first time through block 260 (Frame_Count=$N_l$), the long-term average noise energy $\overline{EN}$ is initialized by subtracting 12 dB from the average energy $\overline{E}$:

$$\overline{EN} = \overline{E} - 12\text{dB}$$

Next, at block 265, a spectral difference value $SD_1$ is calculated using the normalized Itakura-Saito measure. The value $SD_1$ is a measure of the difference between two spectra (the current frame spectra represented by R and $E_{rr}$, and the background noise spectrum represented by $\vec{a}$. The Itakurass-Saito measure is a well-known algorithm in the speech processing art and is described in detail, for example, in *Discrete-Time Processing of Speech Signals*, Deller, John R., Proakis, John G. and Hansen, John H. L., 1987, pages 327–329, herein incorporated by reference. Specifically, $SD_1$, is defined by the following equation:

$$SD_1 = \frac{\vec{a}^T R \vec{a}}{Err}$$

where $E_{rr}$ is the prediction error from linear prediction (LP) analysis of the current frame;

R is the auto-correlation matrix from the LP analysis of the current frame; and $\vec{a}$ is a linear prediction filter describing the background noise obtained from $\overline{LSFN}$.

At block 270 the spectral differences $SD_2$ and $SD_3$ are calculated using a mean square error method according to the following equations:

$$SD_2 = \sum_{i=1}^{p} [\overline{LSF}_{S(i)} - \overline{LSF}_{N(i)}]^2$$

$$SD_3 = \sum_{i=1}^{p} [\overline{LSF}s(i) - \overline{LSF}(i)]^2$$

Where $\overline{LSF}$s is the short-term average of LSF;

$\overline{LSF}$N is the long-term average noise spectrum; and

LSF is the current LSF extracted by the parameter extraction.

The long-term mean of $SD_2$ (sm_$SD_2$) in the preferred embodiment is updated at block 275 according to the following equation:

sm_SD2=0.4*SD2+0.6*sm_SD2

Thus, the long term mean of $SD_2$ is a linear combination of the past long-term mean and the current $SD_2$ value.

The initial voicing decision, obtained in block 280, is denoted by $I_{VD}$. The value of $I_{VD}$ is determined according to the following decision statements:

If $\overline{E}s \geqq \overline{E}N + X_1$ dB
OR
$E > \overline{E}N + X_2$ dB
then IVD=1;
If $\overline{E}s - \overline{E}N < X_3$ dB
AND
sm_$SD_2$<T3
AND
Frame_Count>128
then IVD=0; else IVD=1;
If E>½ ($E^{-1}$+E )+$X_4$dB
OR
$SD_1$>1.5
then $I_{vd}$=1.

In the preferred embodiment, $X_1=1$, $X_2=3$, $X_3=2$, $X_4=7$, and $T_3=0.00012$.

The initial voicing decision is smoothed at block 285 to reflect the long term stationary nature of the speech signal. The smoothed voicing decision of the frame, the previous frame and the frame before the previous frame are denoted by $S_{VD}^0$, $S_{VD}^{-1}$ and $S_{VD}^{-2}$, respectively. Both $S_{VD}^{-1}$ and $S_{VD}^{-2}$ are initialized to 1 and $S_{VD}^0=I_{VD}$. A Boolean parameter $F_{VD}^{-1}$ is initialized to 1 and a counter denoted by $C_e$ is initialized to 0. The energy of the previous frame is denoted by $E_{-1}$. Thus, the smoothing stage is defined by:

```
if F^-1 = 1 and I_VD = 0 and S_VD^-1 = 1 and S_VD^-2 = 1
    S_VD^0 = 1
    C_e = C_3 +1
    if C_i ≦ T_4 {
        F_VD^-1 = 1
        }
    else {
        F_VD^-1 = 0
        C_3 = 0
        {
    {
else
F_VD^-1 = 1
```

Ce is reset to 0 if $S_{VD}^{-1}$=1 and $S_{VD}^{-2}$=1 and IVD=1.

If $P_{flag}$=1, then $S^o{}_{VD}$=1

If E<15 dB, then $S^o$VD=0

In the preferred embodiment, $T_4$=14 The final value of $S^o{}_{VD}$ represents the final voicing decision, with a value of "1" representing an active voice speech signal, and a value of "0" representing a non-active voice speech signal $F_{SD}$ is a flag which indicates whether consecutive frames exhibit spectral stationarity (i.e., spectrum does not change dramatically from frame to frame). $F_{SD}$ is set at block 290 according to the following where $C_s$ is a counter initialized to 0.

If Frame_Count>128 AND $SD_3$<T5 then
$C_s = C_s + 1$ else
$C_s = 0$;
If $C_s$>N
$F_{SD}$=1 else
$F_{SD}$=0.

In the preferred embodiment, T5=0.0005 and N=20.

The running averages of the background noise characteristics are updated at the last stage of the VAD algorithm. At block 295 and 300, the following conditions are tested and the updating takes place only if these conditions are met:

If $\overline{E}s < \overline{E}N + 3$ AND $P_{flag}=0$ then EN=βEN* $\overline{E}N$+(1−βEN)*[max of E AND $\overline{E}s$] AND $\overline{LSF}N(i)$=βLSF*$\overline{LSF}N(i)$+(1−βLSF)*LSF $(i)_i$=1, . . .p If Frame Count>128 AND $\overline{E}N$<Min AND FSD=1 AND $P_{flag}$=0 then
$\overline{E}N$=Min else If Frame _Count>128 AND $\overline{E}N$>Min+10 then
$\overline{E}N$=Min.

Figure 1:
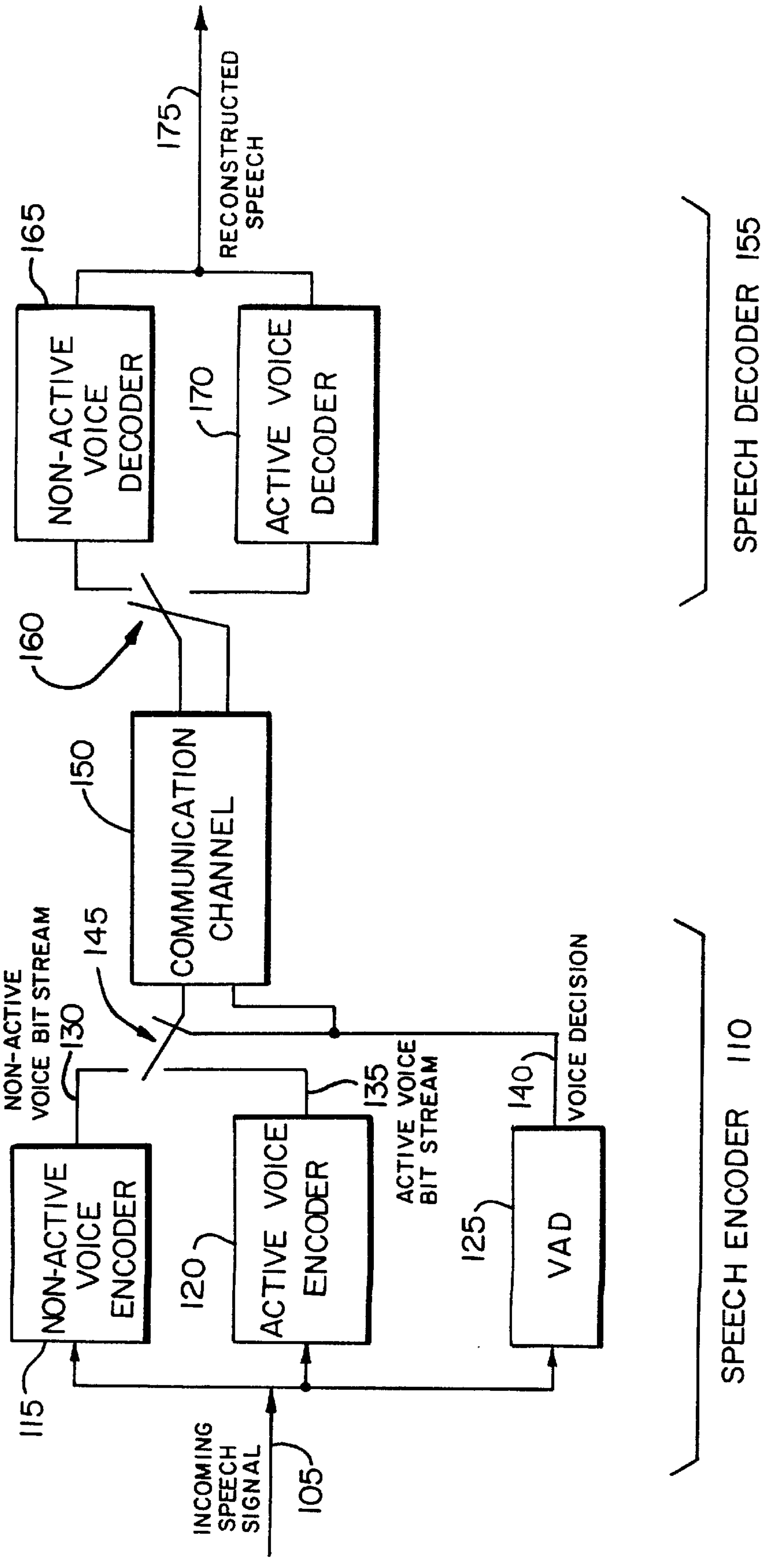
FIG. 1 PRIOR ART
FIG. 1 is a block diagram representation of a speech communication system using a VAD.
Figure 3:
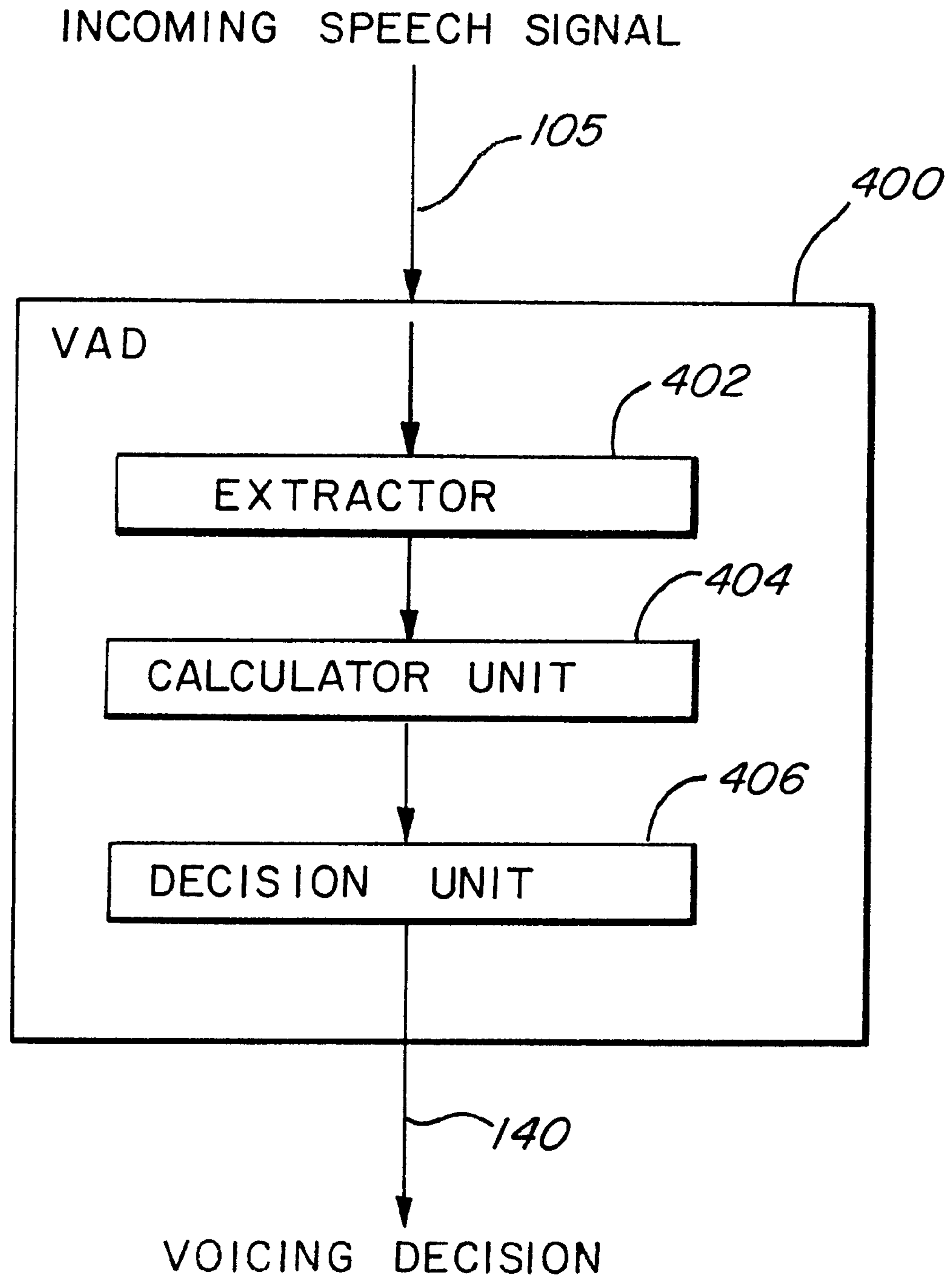
FIG. 3 is a block diagram illustrating one embodiment of a VAD according to the present invention

FIG. 3 illustrates a block diagram of one possible implementation of a VAD 400 according to the present invention. An extractor 402 extracts the required predetermined parameters, including a pitch lag and a pitch gain, from the incoming speech signal 105. A calculator unit 404 performs the necessary calculations on the extracted parameters., as illustrated by the flowcharts in FIGS. 2(A) and 2(B). A decision unit 406 then determines whether a current speech frame is an active voice or a non-active voice signal and outputs a voicing decision 140 (as shown in FIG. 1).

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. In a speech communication system, a method for generating a frame voicing decision, the steps of the method comprising:

extracting a set of parameters, including pitch gain and pitch lag, from an incoming speech signal, for each frame;

calculating a standard deviation of the pitch lag from the extracted parameters over a consecutive number of subframes;

calculating a long term average of the pitch gain from the extracted parameters; and making a frame voicing decision according to the results of said calculation step.

2. The method according to claim 1, wherein the extracted set of parameters further comprises a full band energy and line spectral frequencies (LSF).

3. The method according to claim 2, further comprising the steps of:

calculating a short-term average of energy E, $\overline{E}s$;

calculating a short-term average of $\overline{LSF}s$;

calculating an average energy $\overline{E}$; and calculating an average LSF value, $\overline{LSF}n$.

4. The method according to claim 3, further comprising the steps of:

calculating a spectral difference $SD_1$ using a normalized Itakura-Saito measure;

calculating a spectral difference $SD_2$ using a mean square error method;

calculating a spectral difference $SD_3$ using a mean square error method; and calculating a long-term mean of $SD_2$.

5. The method according to claim 4, wherein the frame voicing decision is made based on the calculated values.

6. The method according to claim 5, further comprising the step of smoothing the frame voicing decision.

7. The method according to claim 6, further comprising the step of performing an initialization for a predetermined number of initial frames, such that the voicing decision is set to active voice or non-active voice.

8. A Voice Activity Detector (VAD) for making a voicing decision on an incoming speech signal frame, the VAD comprising:

an extractor for extracting a set of parameters, including pitch gain and pitch lag, from the incoming speech signal for each frame;

a calculator unit for calculating a standard deviation of the pitch lag from the extracted parameters over a consecutive number of subframes and a long term mean pitch gain from the extracted parameters; and a decision unit for making a frame voicing decision according to the results from the calculator unit.

9. The VAD according to claim 8, wherein the extractor also extracts the parameters full band energy and line spectral frequencies (LSF).

10. The VAD according to claim 9, wherein the calculator unit further calculates:

a short-term average of energy E, $\overline{E}s$;

a short-term average of LSF, $\overline{LSF}s$;

an average energy $\overline{E}$; and an average LSF value, $\overline{LSFN}$.

11. The VAD according to claim 10, wherein the calculator unit further calculates:

a spectral difference $SD_1$ using a normalized Itakura-Saito measure;

a spectral difference $SD_2$ using a mean square error method;

a spectral difference $SD_3$ using a mean square error method; and a long-term mean of $SD_2$.

12. The VAD according to claim 11, wherein the decision unit makes a frame voicing decision according to the values calculated by the calculator unit.

13. The VAD according to claim 12, wherein the voicing decision is smoothed.

* * * * *

UNITED STATES PATENT AND TRADEMARK OFFICE

CERTIFICATE OF CORRECTION

PATENT NO. : 6,188,981 B1

DATED : February 13, 2001

INVENTOR(S) : Adil Benyassine and Eyal Shlomot

It is certified that error appears in the above-identified patent and that said Letters Patent is hereby corrected as shown below:

ON THE TITLE PAGE

At (54), please correct the title as follows:

METHOD AND APPARATUS FOR DETECTING VOICE ACTIVITY AND SILENCE IN A SPEECH SIGNAL USING PITCH LAG AND PITCH GAIN STATISTICS

Signed and Sealed this

Twenty-ninth Day of May, 2001

Attest:

Nicholas P. Godici

NICHOLAS P. GODICI

*Attesting Officer* — *Acting Director of the United States Patent and Trademark Office*